US009449259B1

(12) United States Patent
Cheng et al.

(10) Patent No.: US 9,449,259 B1
(45) Date of Patent: Sep. 20, 2016

(54) OPPORTUNISTIC CASCADE AND CASCADE TRAINING, EVALUATION, AND EXECUTION FOR VISION-BASED OBJECT DETECTION

(75) Inventors: Shinko Y. Cheng, Campbell, CA (US); Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 631 days.

(21) Appl. No.: 13/558,298

(22) Filed: Jul. 25, 2012

(51) Int. Cl.
*G06K 9/62* (2006.01)
*G06K 9/46* (2006.01)
*G06K 9/66* (2006.01)
*G06K 9/68* (2006.01)
*G06K 9/70* (2006.01)
*G06N 99/00* (2010.01)

(52) U.S. Cl.
CPC ........... *G06K 9/6257* (2013.01); *G06K 9/6217* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 7,450,766 B2 * | 11/2008 | Luo | ...................... | G06K 9/6256 382/115 |
| 7,505,621 B1 * | 3/2009 | Agrawal | ............ | G06K 9/00288 382/118 |
| 8,024,189 B2 * | 9/2011 | Zhang | .................. | G06K 9/4614 382/116 |
| 8,270,671 B1 * | 9/2012 | Medasani | .......... | G06K 9/00986 382/103 |
| 8,447,139 B2 * | 5/2013 | Guan | .................. | G06K 9/00818 382/224 |
| 8,515,184 B1 * | 8/2013 | Medasani | ............ | G06K 9/6257 382/181 |
| 8,693,791 B2 * | 4/2014 | Sawai | .................. | G06K 9/6267 348/152 |
| 2002/0102024 A1 * | 8/2002 | Jones | .................. | G06K 9/6256 382/225 |
| 2006/0008151 A1 * | 1/2006 | Lin et al. | ...................... | 382/190 |
| 2007/0110292 A1 * | 5/2007 | Bi | ........................ | G06K 9/6256 382/128 |

(Continued)

OTHER PUBLICATIONS

P. Viola and M. Jones, "Rapid object detection using a boosted cascade of simple features," in Proc. IEEE Conf. on Computer Vision and Pattern Recognition, 2001, vol. I, pp. 511-518.*

(Continued)

*Primary Examiner* — Matthew Bella
*Assistant Examiner* — Jose M Torres
(74) *Attorney, Agent, or Firm* — Tope-McKay & Associates

(57) ABSTRACT

The present invention relates to a classifier cascade object detection system. The system operates by inputting an image patch into parallel feature generation modules, each of the feature generation modules operable for extracting features from the image patch. The features are provided to an opportunistic classifier cascade, the opportunistic classifier cascade having a series of classifier stages. The opportunistic classifier cascade is executed by progressively evaluating, in each classifier in the classifier cascade, the features to produce a response, with each response progressively utilized by a decision function to generate a stage response for each classifier stage. If each stage response exceeds a stage threshold then the image patch is classified as a target object, and if the stage response from any of the decision functions does not exceed the stage threshold, then the image patch is classified as a non-target object.

21 Claims, 11 Drawing Sheets

(56) References Cited

U.S. PATENT DOCUMENTS

| | | | |
|---|---|---|---|
| 2009/0161912 A1* | 6/2009 | Yatom et al. | 382/103 |
| 2009/0244291 A1* | 10/2009 | Saptharishi et al. | 348/187 |
| 2010/0272351 A1* | 10/2010 | Kato | G06K 9/00986 382/159 |
| 2011/0142345 A1* | 6/2011 | Yoon et al. | 382/190 |
| 2011/0182497 A1* | 7/2011 | Uliyar et al. | 382/154 |
| 2011/0255743 A1* | 10/2011 | Guan et al. | 382/103 |
| 2012/0093397 A1* | 4/2012 | Wang | G06K 9/4614 382/159 |
| 2012/0219210 A1* | 8/2012 | Ding | G06K 9/4642 382/159 |
| 2013/0329988 A1* | 12/2013 | Levi | G06K 9/00805 382/159 |

OTHER PUBLICATIONS

P. Viola and M. Jones, "Robust real-time object detection," IEEE Conf. on Computer Vision and Pattern Recognition, 2001.

R. Xiao, L. Zhu, H. J. Zhang, "Boosting Chain Learning for Object Detection," IEEE Conf. on Computer Vision and Pattern Recognition, 2003.

H. Schneiderman, "Feature-Centric Evaluation for Efficient Cascaded Object Detection," IEEE Conf. on Computer Vision and Pattern Recognition, 2004.

L. Bourdev and J. Brandt, "Robust Object Detection Via Soft Cascade," IEEE Conf. on Computer Vision and Pattern Recognition, 2005.

N. Dalal and B. Triggs, "Histograms of Oriented Gradients for Human Detection," IEEE Conf. on Computer Vision and Pattern Recognition, 2005.

J. Friedman, T. Hastie, and R. Tibshurani, "Additive Logistic Regression: a Statistical View of Boosting," 1998.

M. Gressman, et al., "Surround View Pedestrian Detection Using Heterogeneous Classifier Cascades," 2011 14th International IEEE Conference on Intelligent Transportation Systems, Washington, DC, USA, Oct. 5-7, 2011, pp. 1317-1324.

* cited by examiner

| Stage Number | Features Used | Classifier |
|---|---|---|
| 0 | Haar | GentleBoost |
| 1 | ESF | GentleBoost |
| 2 | HaarESF | GentleBoost |
| 3 | Gabor | GentleBoost |
| 4 | HaarESFGabor | GentleBoost |
| 5 | HOG | GentleBoost |
| 6 | HaarESFGaborHOG | GentleBoost |
| 7 | HaarESFGaborHOG | GentleBoost |
| 8 | HaarESFGaborHOG | GentleBoost |

FIG. 8

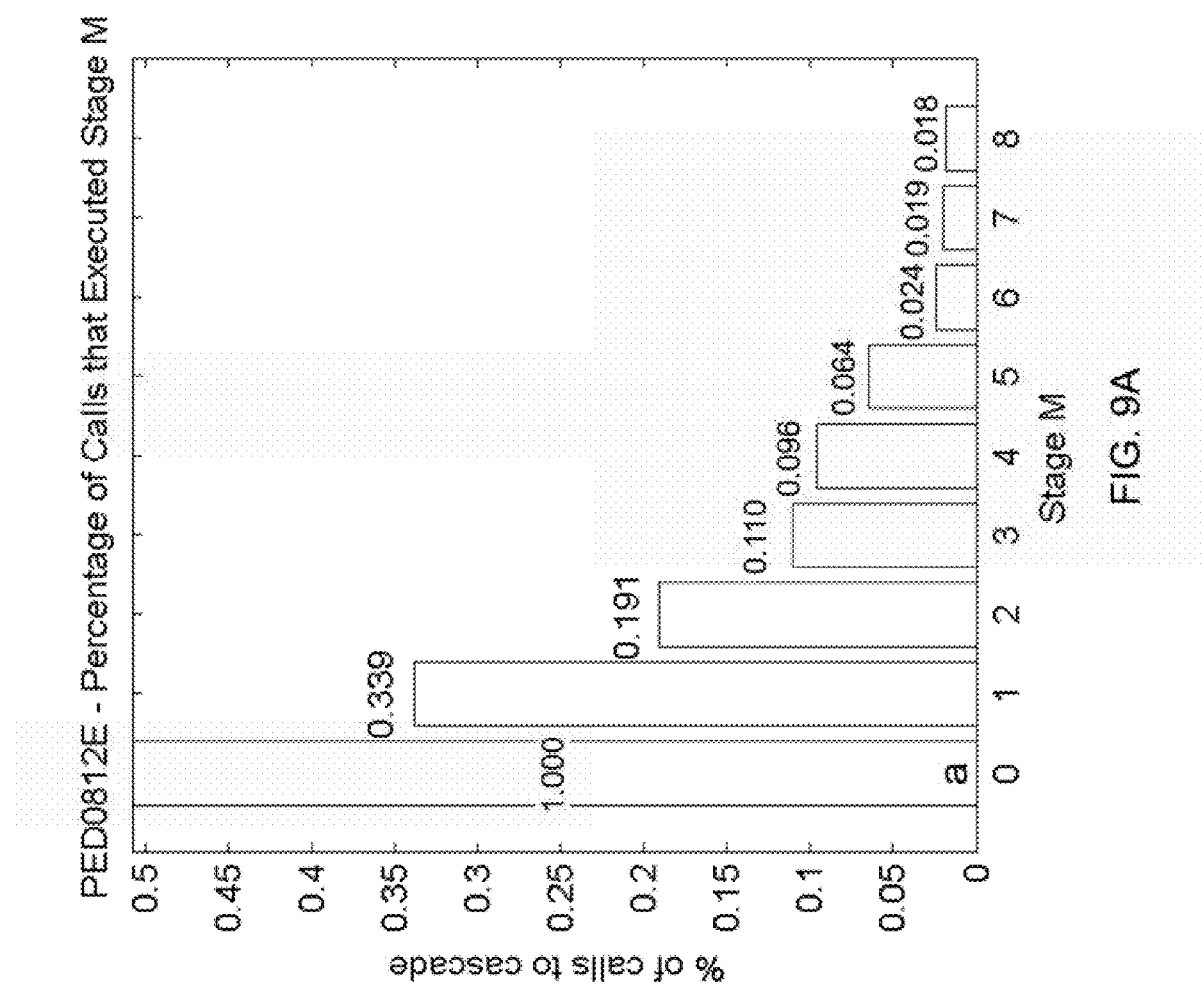

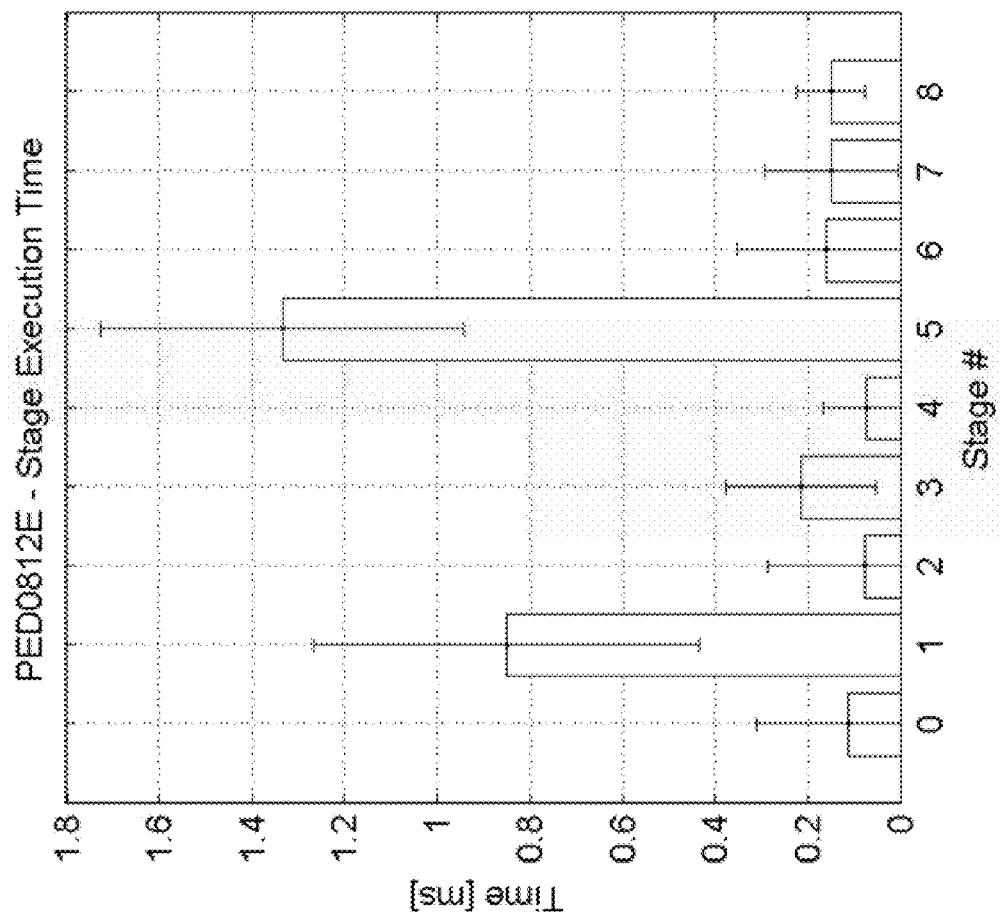

OPPORTUNISTIC CASCADE AND CASCADE TRAINING, EVALUATION, AND EXECUTION FOR VISION-BASED OBJECT DETECTION

FIELD OF INVENTION

The present invention relates to an object detection system and, more particularly, to a system for training, evaluating, executing vision-based object detection.

BACKGROUND OF INVENTION

The present invention is directed to a classifier cascade that can be used to detect objects within a scene. While existing classifier cascades exist, such existing systems do not employ a diverse and complimentary set of features for object detection.

For example, H. Schneiderman proposes a feature-level optimization of a cascade object detector, taking advantage of the redundancies in computing features for various analysis windows (see Literature Reference No. 3). Schneiderman's approach is tuned for an exhaustive search of an image where neighboring analysis windows have a large common area. The efficiency gain is reduced where the search pattern is sparse, such as is the case when using particle swarm optimization.

Alternatively, other methods collect bootstrapped negative samples for training. Existing approaches exhaustively search for a collection of "hard" samples (see Literature Reference Nos. 1-3). Such a search performed using features and classifiers other than Haar-like features from integral images and ensemble classifiers, features and classifiers that are compute-intensive become problematic (see Literature Reference Nos. 1-4). Features like histogram-of-oriented gradients, edge-symmetry features, and classifiers like kernel support-vector-machines make collecting training samples by exhaustive search not feasible.

Finally, existing approaches to the classifier-cascade do not use a heterogeneous set of features and classifiers in the construction of the cascade.

Thus, a continuing need exists for an object detection system that is efficient in finding objects, that is employed to rapidly find the "hard" set of negative training samples (despite the computationally intense features and classifiers), and that allows for fine tuning of the appropriate set of features and classifiers for use with specific object types.

SUMMARY OF INVENTION

The present invention is directed to a cascade-based system for training, evaluating, and executing vision-based object detection. In one aspect, the system is a classifier cascade object detection system, comprising a memory and one or more processors. The memory includes executable instructions encoded thereon, such that upon execution of the instructions by the one or more processors, the one or more processors perform several operations, such as inputting an image patch, into parallel feature generation modules, each of the feature generation modules operable for extracting features from the image patch; providing the features to a classifier cascade, the classifier cascade having a series of classifiers; and executing the classifier cascade by progressively evaluating, in each classifier in the classifier cascade, the features to produce a response, if each classifier produces a response that exceeds a predefined threshold then the image patch is classified as a target object, and if the response from any of the classifiers in the classifier cascade does not exceed the predefined threshold, then the image patch is classified as a non-target object.

In another aspect the classifier cascade is an opportunistic classifier cascade. In this aspect, the processor performs operations of inputting an image patch into parallel feature generation modules, each of the feature generation modules operable for extracting features from the image patch; providing the features to an opportunistic classifier cascade, the opportunistic classifier cascade having a series of classifier stages; and executing the opportunistic classifier cascade by progressively evaluating, in each classifier in the classifier cascade, the features to produce a response, with each response progressively utilized by a decision function to generate a stage response for each classifier stage, such that if each stage response exceeds a stage threshold then the image patch is classified as a target object, and if the stage response from any of the decision functions does not exceed the stage threshold, then the image patch is classified as a non-target object.

In another aspect, the decision function utilizes a weight sum of the classifier responses of a current classifier stage and previous classifier stages, as follows:

$$f_n(h_0, h_1, \ldots) = \sum_{i=0}^{n} \alpha_{n,i} \cdot h_i,$$

where $f_n$ is the stage response for stage n, $\alpha_n$ is a weight, and $h_i$ is a classifier response.

In yet another aspect, if $f_n > \tau_n$, where $\tau_n$ is a stage threshold for stage n, the image patch is analyzed by a next stage or classified as a target object; otherwise, the image patch is classified as anon-target object. Additionally, the weights an are set to all ones.

Further, the classifier cascade is trained by performing operations of loading parameters of the image patch, including window position (x,y) with respect to a larger image and window height (h); loading a cascade template file, the cascade template file defining a number of classifier stages in the classifier cascade, one or more feature types, a classifier type to use in each classifier stage, an aspect ratio of the image patch, and a height of an image storage container which all image patches are re-sampled to; computing features based on features specified in the cascade template file; compiling the features for a classifier trainer, the classifier trainer generating a trained classifier; generating a Receiver-Operating-Characteristics (ROC) curve, which includes false-alarm rate and true-detection rate pairs (FAR,TDR) for a given stage threshold; and tuning the stage threshold. The stage threshold is tuned by finding the threshold $\tau^*$ required to achieve the specified target stage true-detection rate (Target TDR), using the ROC curve.

In another aspect, the stage threshold is tuned by setting a stage threshold is set such that:

$$\tau^* = \{\tau: \text{TDR} = \text{Target TDR}\}.$$

where TDR is the True Detection Rate curve function for a current classifier stage, such that the target TDR is a parameter used to tune a number of examples to be further analyzed by subsequent classifier stages.

Finally, the present invention is also directed to a computer implemented method and a computer program product. The computer implemented method includes a plurality of acts of causing a computer to perform the operations listed herein, while the computer program product includes instructions encoded on a memory for causing a processor to perform such operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is a table illustrating a structure of the classifier cascade as used in FIG. 7;

FIG. 9A is a bar graph depicting that a proportion of calls that execute Stages 0-8 are shown to decay for every stage as intended;

FIG. 9B is a bar graph depicting that the amount of time required to compute a particular stage is reduced when the average percentage of time a stage is executed.

DETAILED DESCRIPTION

Figure 1:
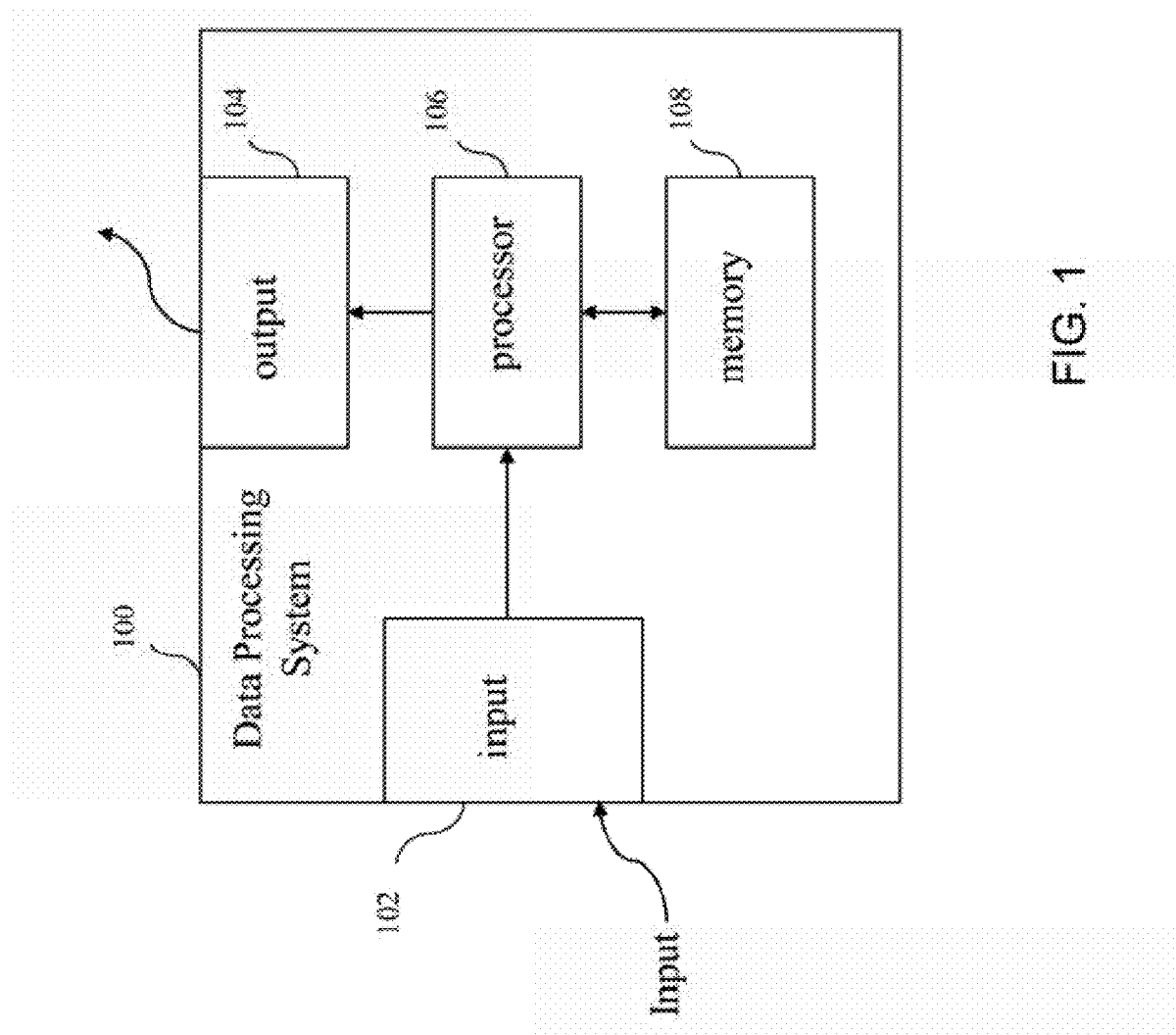
FIG. 1 is a block diagram depicting the components of an object detection system of the present invention.

The present invention relates to an object detection system and, more particularly, to a system for training, evaluating, executing vision-based object detection. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Finally, details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as listed below:

1. P. Viola and M. Jones, "Robust real-time object detection," IEEE Conf. on Computer Vision and Pattern Recognition, 2001.
2. R. Xiao, L. Zhu, H. J. Zhang, "Boosting Chain Learning for Object Detection," IEEE Conf. on Computer Vision and Pattern Recognition, 2003.
3. H. Schneiderman, "Feature-Centric Evaluation for Efficient Cascaded Object Detection," IEEE Conf. on Computer Vision and Pattern Recognition, 2004.
4. L. Bourdev and J. Brandt, "Robust Object Detection Via Soft Cascade," IEEE Conf. on Computer Vision and Pattern Recognition, 2005.
5. N. Dalal and B. Triggs, "Histograms of Oriented Gradients for Human Detection," IEEE Conf. on Computer Vision and Pattern Recognition, 2005.
6. J. Friedman, T. Hastie, and R, Tibshirani, "Additive Logistic Regression: a Statistical View of Boosting," 1998.

(2) Principal Aspects

The present invention has three "principal" aspects. The first is an object detection system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a system of the present invention is provided in FIG. 1. The system 100 comprises an input 102 for receiving information from at least one sensor for use in detecting an object in a scene. Note that the input 102 may include multiple "ports." Typically, input is received from at least one sensor, non-limiting examples of which include video image sensors. An output 104 is connected with the processor for providing information regarding the presence and/or identity of object(s) in the scene to other systems in order that a network of computer systems may serve as an image processing system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
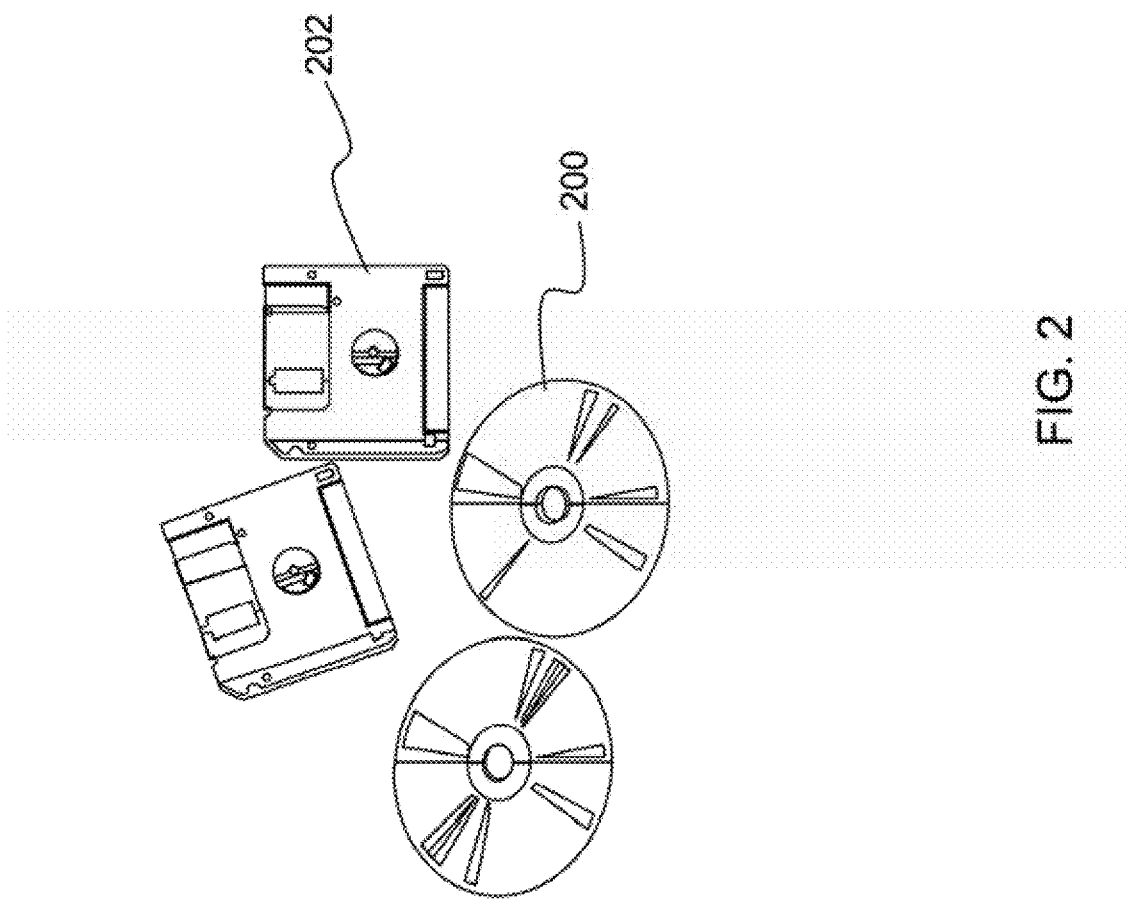
FIG. 2 is an example of a computer program product embodying the present invention.

An illustrative diagram of a computer program product embodying the present invention is depicted in FIG. 2. The computer program product is depicted as an optical disk 200 such as a CD or DVD, or as a floppy disk 202. However, as mentioned previously, the computer program product generally represents computer-readable instructions stored on any non-transitory compatible computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored in the memory of a computer or on a computer-readable medium such as a floppy disk, a CD-ROM, and a flash drive.

(3) Introduction

The present invention is directed to a classifier cascade called the opportunistic cascade that is used to transform camera images to a likelihood image where the peaks indicate the most likely positions of the objects-of-interest in the image. With this likelihood image, a search algorithm (without implying limitation, one exemplary embodiment comprises panicle swarm optimization) is used to locate the position and scale of the peaks in the image. Associated with the classifier cascade is a method to efficiently train, evaluate and execute classifier cascades of arbitrary number of stages, and stage configurations, including the opportunistic cascade.

The cascade comprises a set of stages with a heterogeneous set of features and classifiers specified programmatically. This framework allows a rich range of possible configurations for the cascade designer to create. An aspect of the opportunistic cascade is the efficient use of computed features and classifier responses from earlier stages to make better classifications of candidate image patches in later stages. The key elements that provides the efficiency in the method of training, evaluating and executing classifier cascades lie in the 1) threshold tuning criteria used to set a threshold dictating when an example would advance to the next stage in the cascade for further processing, and 2) the method of calling the feature generation and classification functions in the correct sequence specified at cascade initialization.

The present invention provides a robust classifier cascade and a streamlined tool for very rapid generation of classifier cascades used in vision-based object detection, which has a wide range of applications. For example, the system can be implemented in adult and child pedestrian detection for vehicles, and visual sensing of people in the factory floor for advanced robotic factory automation to enable robots and human to work in close proximity. The system can also be implemented in air and ground vehicles for surveillance applications. This invention allows these systems to quickly amass a large number of efficient and robust cascades to detect both a wider variety of objects, as well as the same objects under a variety of conditions at a higher rate of correct detection.

(4) Details of the Invention

The present invention implements a method for transforming images of objects-of-interest to maps that indicate the likelihood of the objects presence at various locations in the image. This transformed image is then processed to locate the position and scale in the image. Particle Swarm Optimization, a search algorithm, is used to locate the peaks in this likelihood map, detecting the object in the image.

A cascade of classifiers processes a window or image patch of the image one stage at a time. A classifier stage in the cascade must exceed a predetermined threshold before being processed by the next stage. Only images that pass through all the stages yield the highest likelihood score, and are in contention to be recognized as an object in the image. For efficiency, each classifier stage is biased towards high recognition rate at the expense of a higher false alarm rate. Then, later more complex stages will review the false alarms and be tuned to eliminate as many of them as possible. The cascade structure allows both accuracy and efficiency to be high.

Figure 3:
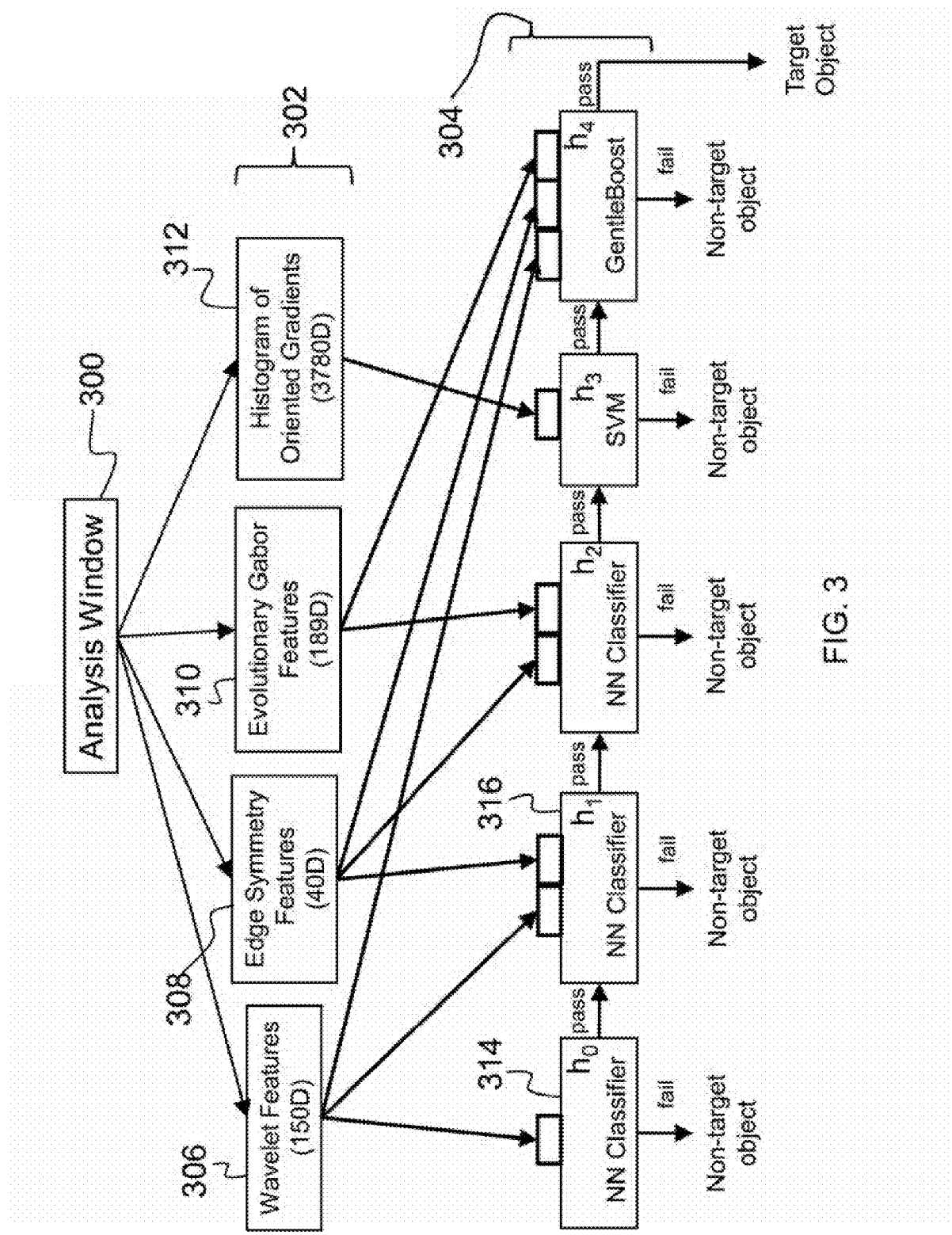
FIG. 3 is flowchart illustrating an example classifier cascade for vision-based object detection, depicting that classification response is denoted as $h_n$ and is used to determine whether to proceed to the next stage of analysis.

An example classifier cascade for vision-based object detection is shown in FIG. 3. An analysis window 300 or image patch is input to parallel feature generation modules 302, which is then used by a series of classifiers which constitute the classifier cascade 304. As a non-limiting example, the feature generation modules 302 include 4 different feature generation modules, such as waveler features 306, edge symmetry features 308, evolutionary Gabor features module 310, and a histogram of oriented gradients 312. Each of the feature generation modules 302 is operable for extracting/generating the applicable features from the image patch or analysis window 300.

A non-limiting example of a wavelet feature 306 module, an edge symmetry feature 308 module, and/or an evolutionary Gabor feature 310 module includes the techniques described in at least one of U.S. patent application Ser. Nos. 12/456,558, 12/583,239, and 12/462,017, entitled, "Multistage method for object detection using cognitive swarms and system for automated response to detected objects," and "Method for flexible feature recognition in visual systems incorporating evolutionary optimization," and "System for visual object recognition using heterogeneous classifier cascades," respectively; all of which are commonly owned by the assignee of the present application and of which are incorporated by reference as though fully set forth herein. Further, a non-limiting example of a suitable histogram of oriented gradient 312 module includes the histogram and oriented graded features as described by N. Dalal and B. Triggs (See Literature Reference No. 5).

In one embodiment illustrated in FIG. 3, there are four different feature generation modules, which are then used by 5 different classifiers to constitute a 5-stage classifier cascade. The execution of the cascade proceeds' by first evaluating the first classifier 314 in the cascade 304. Only the features needed by the first classifier 314 stage are generated. Classification response is denoted as $h_n$ and is used to determine whether to proceed to the next stage of analysis. If the classifier 314 produces a response that exceeds a predefined threshold (i.e., pass), which is tuned during the training of the cascade described below, then the image patch is analyzed further by the second stage 316, and so on. If a feature is used at a later stage, such as the wavelet feature for the $2^{nd}$ and $5^{th}$ stages, the feature vector is copied rather than recomputed. On the other hand, if the response from the first stage 314 does not exceed the threshold (i.e., fail), the image patch is classified as a non-target and features that have not yet been computed are not computed at all for this image patch. If the image patch survives (i.e., passes) to the last and $5^{th}$ stage, the image patch is classified as a target object.

Figure 4:
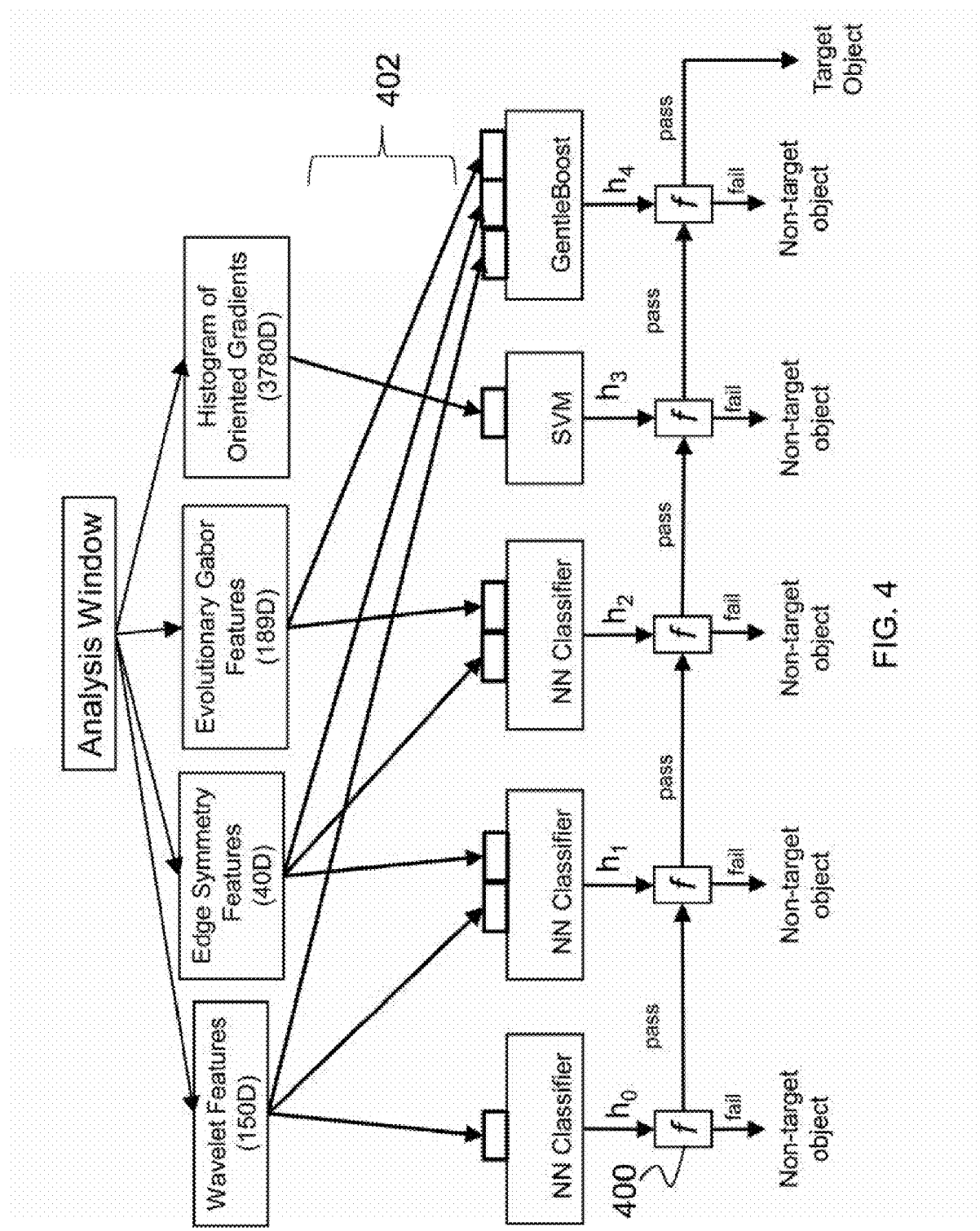
FIG. 4 is a flowchart illustrating an example of an opportunistic Cascade for vision-based object detection, depicting that a decision function $f$ is used to incorporate classifier responses from earlier stages to make a stronger decision.

As shown in FIG. 4, the present invention includes a new, opportunistic classifier cascade; which is distinct from a regular classifier cascaded in that it uses a decision function that combines the classifier responses from previous stages to make a classification at later stages. Although not limited thereto, one such function can be defined as follows.

Letting $X_m$ be the feature vector of type m, then the classifier response from stage n is $h_n(X_m)$. In a regular classifier cascade of the prior art, if the classifier response $h_n$ exceeds a certain threshold, the image patch will be further analyzed by the next stage, or classified as the target object if the n is the last stage.

In contrast, in the opportunistic cascade classifier of the present invention, a decision function $f_n(h_0, h_1, \ldots)$ 400 in FIG. 4 is used to generate the stage response and determine the fate of the image patch. This decision function takes the weighted sum of the classifier responses of the current and previous stages, as follows:

$$f_n(h_0, h_1, \ldots) = \sum_{i=0}^{n} \alpha_{n,i} \cdot h_i,$$

where $f_n$ is the stage response for stage n. If $f_n > \tau_n$, where $\tau_n$ is the stage threshold for stage n, the image patch is analyzed by the next stage or classified as the target object; otherwise, the image patch is classified as a non-target object. The weights $\alpha_n$ are set to all ones to take an average of the classification responses. This results in an approximation to classifier bootstrap aggregating (bagging), a technique that reduces the variance of the classification estimate and helps avoid classifier over-fitting. The process for determining the $\tau_n$ values is explained below. If $\alpha_n = [0\ 0\ \ldots\ 0\ 1]$, where the only non-zero element is the last element and has the value of 1, then $f_n = h_n$ and the opportunistic cascade reduces to the regular cascade.

For further understanding and as described above, FIG. 4 illustrates an example of an opportunistic cascade for vision-based object detection. As described above, a decision function 400 is used to incorporate classifier responses from earlier stages to make a more accurate decision.

Figure 5:
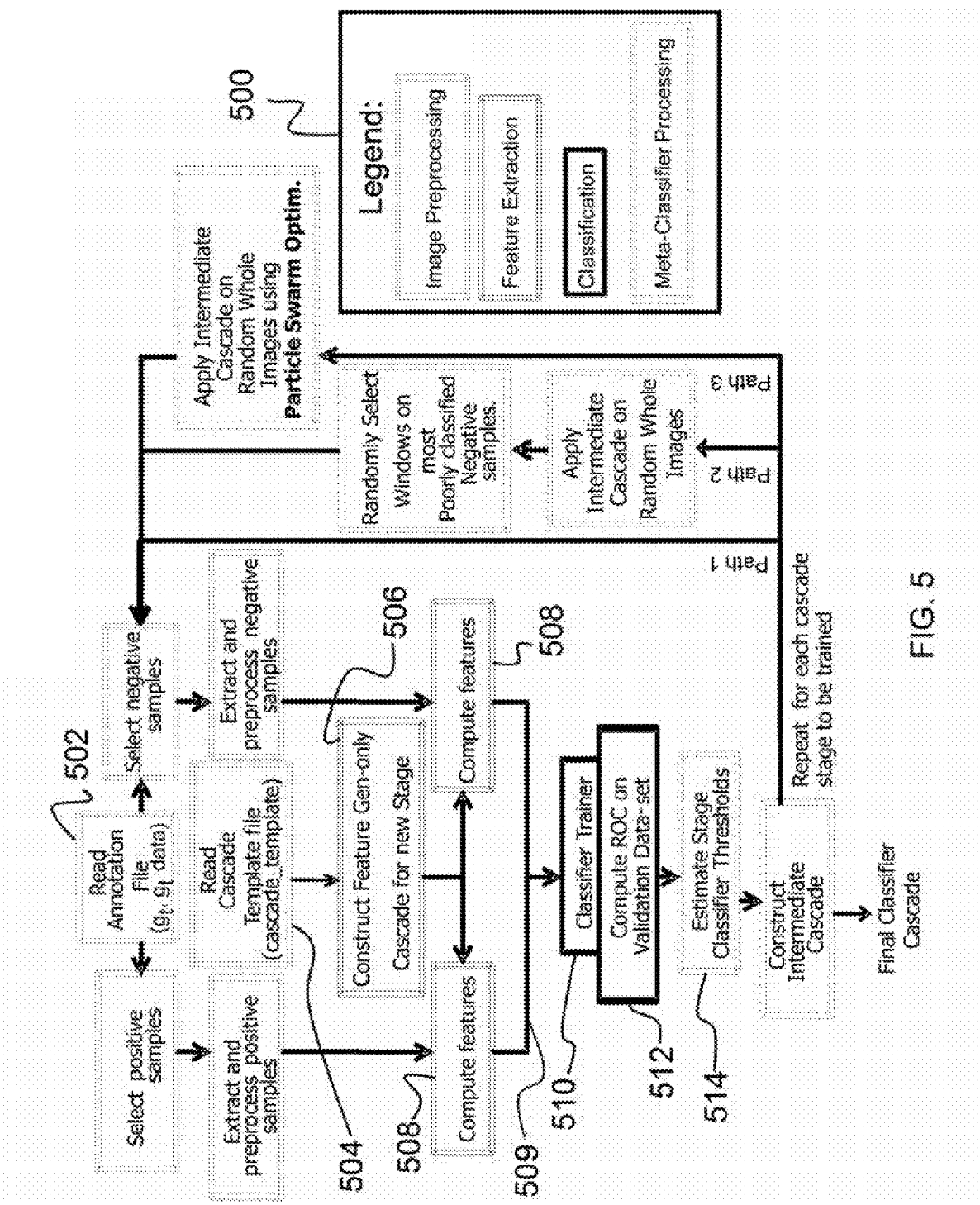
FIG. 5 is a flowchart illustrating processing flow of multi-stage classifier stage training.

Another aspect of the invention is the process of automatically training heterogeneous, multi-stage classifier cascades, as shown in FIG. 5. The flowchart depicted in FIG. 5 includes boxes that are coded (as depicted in the legend 500) to show their relationship to the overall process of classifier training, which consists of image preprocessing, feature extraction, classification, and meta-classifier processing.

The training process begins by reading the annotations of images 502, which consist of the parameters of the window over the target or non-target objects in the scene. This includes the window position in the image (x,y) and the window's height (h)(and/or width). These annotation values are used to extract the samples and retain them in memory. The next step is to load the cascade template file 504. This configuration file consists of all the necessary information to construct a cascade. This includes defining the number of stages, one or more feature types and one classifier type to use in each stage of the cascade, the aspect ratio of the image patch, the height of the image storage container which all patches are re-sampled to. After loading these two files, the process continues to computing the features.

The features are computed based on the features specified in the cascade template file 504. A feature generation only cascade 506 is constructed from the cascade template file 504 up to the current stage, which is the same as a classifier cascade except the classifiers are not specified. The features 509 are then computed from the extracted images in the preprocessing step 508. These features 509 are then compiled together and fed to the Classifier Trainer 510 for this stage.

At this point, the data is prepared for training a classifier of the specified type. The desired classifier type is also specified in the cascade template file 504. Non-limiting examples of suitable classifier types include Neural Networks, GentleBoost, N-Nearest Neighbor classifiers, and Support-Vector-Machines. Such classifiers are commonly known to those skilled in the art. By way of example, GentleBoost was described by Friedman et al. (See Literature Reference No. 6), which is incorporated by reference as though fully set forth herein.

The output of the Classifier Trainer 510 block produces a trained classifier whose performance is measured in the block 512 that follows. At this point, the Receiver-Operating-Characteristics (ROC) curve is generated from the test-set portion of the data-set. With this ROC curve, which are false-alarm rate and true-detection rate pairs (FAR,TDR) for a given cascade threshold, the process proceeds to the last step 514 in training this stage which is the tuning of the stage threshold by a stage threshold module 514.

The stage threshold 514 module calculates the minimum confidence value an image patch is required to receive from the classifier of that stage in order for the patch be processed in the next stage. If the image patch does not exceed this threshold, the image is classified immediately as a non-target. This threshold is determined by finding the threshold $\tau^*$ required to achieve the specified target stage true-detection rate (Target TDR), using the ROC curve computed in the last step. Formally, the stage threshold is set such that:

$$\tau^* = \{\tau: \text{TDR}(\tau) = \text{Target TDR}\},$$

$$\tau^* = \{\tau: \text{TDR} = \text{Target TDR}\}$$

where TDR is the True Detection Rate curve function for the current stage (part of the measured ROC curve for that stage). Tau is the threshold that products a particular TDR.

Tau is set equal to the value that gives the TDR(tau)=Target TDR. The Target TDR is a parameter used to tune the number of examples to be further analyzed by the later stages, which impacts the final performance of the classifier. The threshold is estimated by an exhaustive search, searching for the desired 1) area under the curve AUC(\tau) or 2) as specified by the equation above the TDR(tau) (or equivalently miss-detect rate MDR(\tau)) as the match criteria. The selection of the stage threshold concludes the training of one particular stage. Prior to training the subsequent stage, the negative training data set is optionally reselected.

The new "bootstrapped" negative training dataset is constructed in a combination of the paths. In each path (i.e., Path 1, Path 2, and Path 3), the positive training samples remain the same. The first way (i.e., Path 1) is to reuse of all the negative samples. The second way (i.e., Path 2) is to place windows randomly within the original images, apply the part of the cascade that is trained so far, then collect the windows that were misclassified the worst. The third way (i.e., Path 3) is to apply an actual object detection algorithm with the partially trained cascade on the image itself to locate several negative examples. One or more of these sets of data are compiled and used as the negative training set for the next stage. One example of a suitable object detection algorithm for use in Path 3 is particle-swarm based object detection.

The purpose of constructing the negative dataset in this fashion is for presenting a wider variety of examples to the classifier trainer to produce a more accurate classifier.

Figure 6:
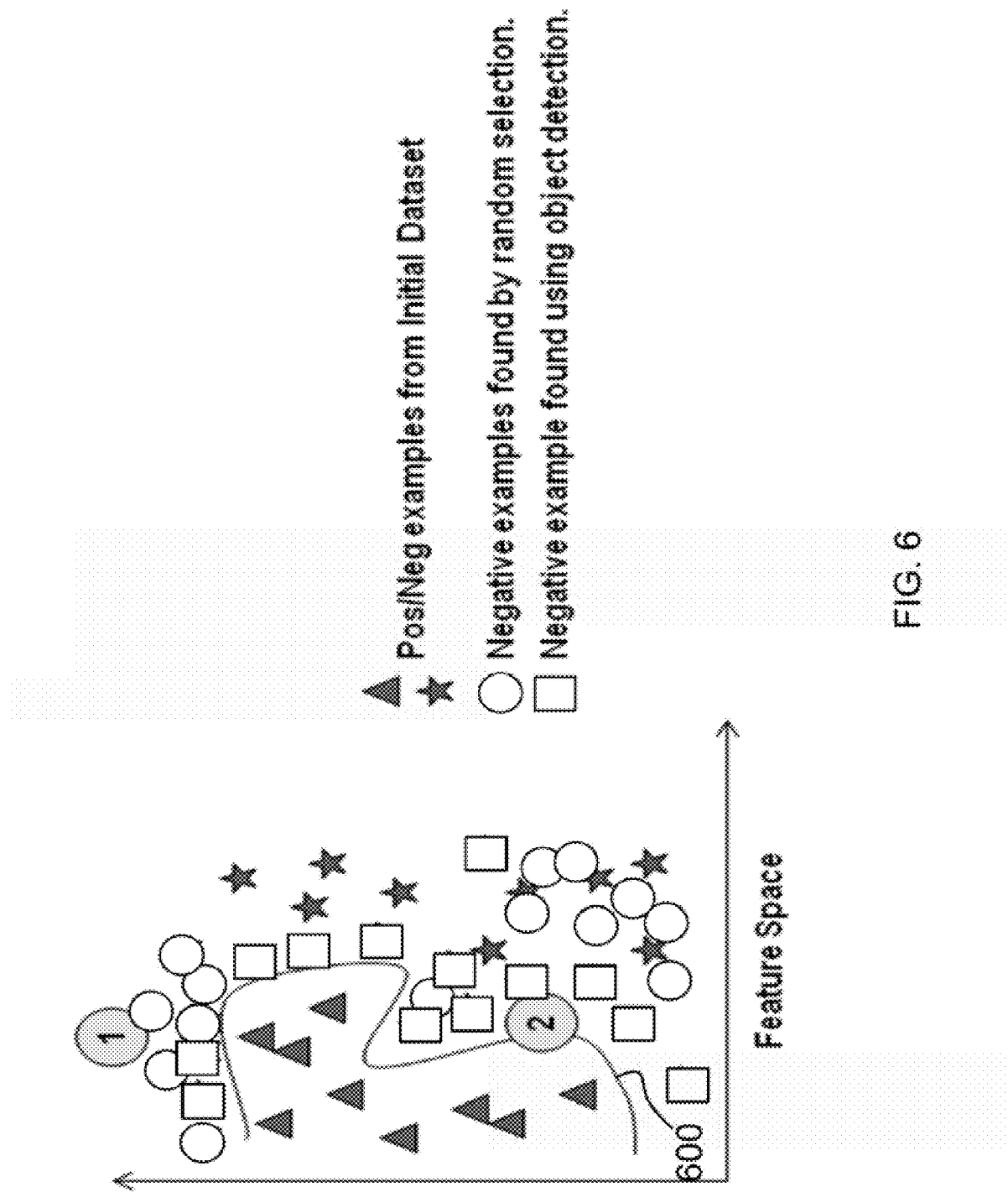
FIG. 6 is graph depicting an initial training data-set, showing a curve that depicts the ideal decision boundary between positive and negative examples with the examples near the boundary considered "hard"

For example, FIG. 6 illustrates an initial training data-set that consist of the triangles and stars. The curve 600 depicts the ideal decision boundary between the positive and negative examples with the examples near the boundary considered "hard". More negative examples may selectively be introduced to better model the decision boundary 600.

In the feature space of the examples, the positive and negative examples may live on their respective side of an ideal decision boundary 600, depicted as a curve. The construction of a new negative dataset allows 1) better exposure to the space of samples by adding them into consideration for training. The region marked (1) in FIG. 6 shows negative examples that are introduced by the bootstrapping procedure, which would otherwise not be represented by the initial dataset. The decision boundary 600 may have had a sub-optimal shape as a result of the lack of negative examples in that region. This is a likely result if negative examples were taken from only a subset of available images. Secondly, because the two bootstrapping procedures retain only the "hard" examples, these examples lie close to the decision boundary 600 and thereby allow the classifier to model a more precise decision boundary 600.

The method uses a feature vector recall mechanism (depicted as element 402 in FIG. 4) to increase the speed in evaluating the cascade. Features that have been computed in earlier stages are made available to other succeeding stages that use the same feature. The mechanism consists of a function within the cascade that will set and check if a particular stage is specified to "load" a feature and a stage number to load the features from. An arbitrary combination of features can thus be constructed with some computed in earlier stages, and others computed at the succeeding stage.

Figure 7:
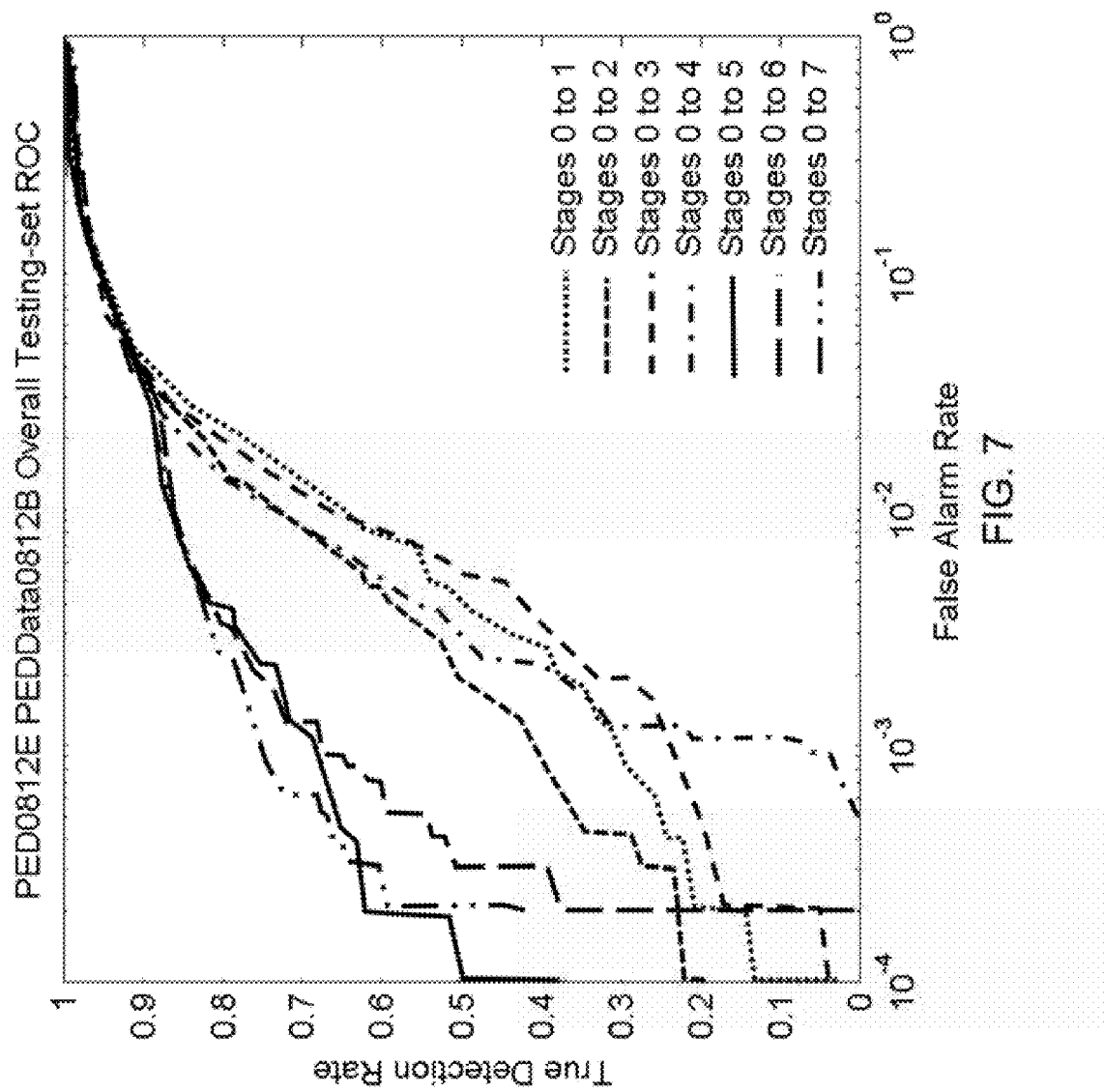
FIG. 7 is an example of a classifier cascade called PED0812E, that includes 8 stages trained using the training program according to the present invention.

The performance of an example classifier trained with an implementation of the method in FIG. 5 is shown in FIG. 7. FIG. 7 illustrates performance of a classifier cascade called PED0812E, which comprises 8 stages trained using the training program as depicted in FIG. 5 and described herein. Eight stages are specified in this classifier and the configuration of features and classifiers of each stage in the cascade is listed in the table depicted in FIG. 8. Haar, ESF, Gabor and HOG are types of features, and GentleBoost is a type of classifier used in this cascade. In this cascade, Stages 2, 4, 6, 7 and 8 use the feature recall mechanism, therefore the computation of the four features modules need only be performed one time during the single execution of this cascade. Furthermore, candidate image patches that do not exceed the stage threshold do not require the computation of features in the later stages at all, assuming these features were specified to be computed in later stages. For example, if a candidate image patch is classified as negative at Stage 0 in cascade PED0812E, the three features ESF, Gabor and HOG are never computed.

Figure 9C:
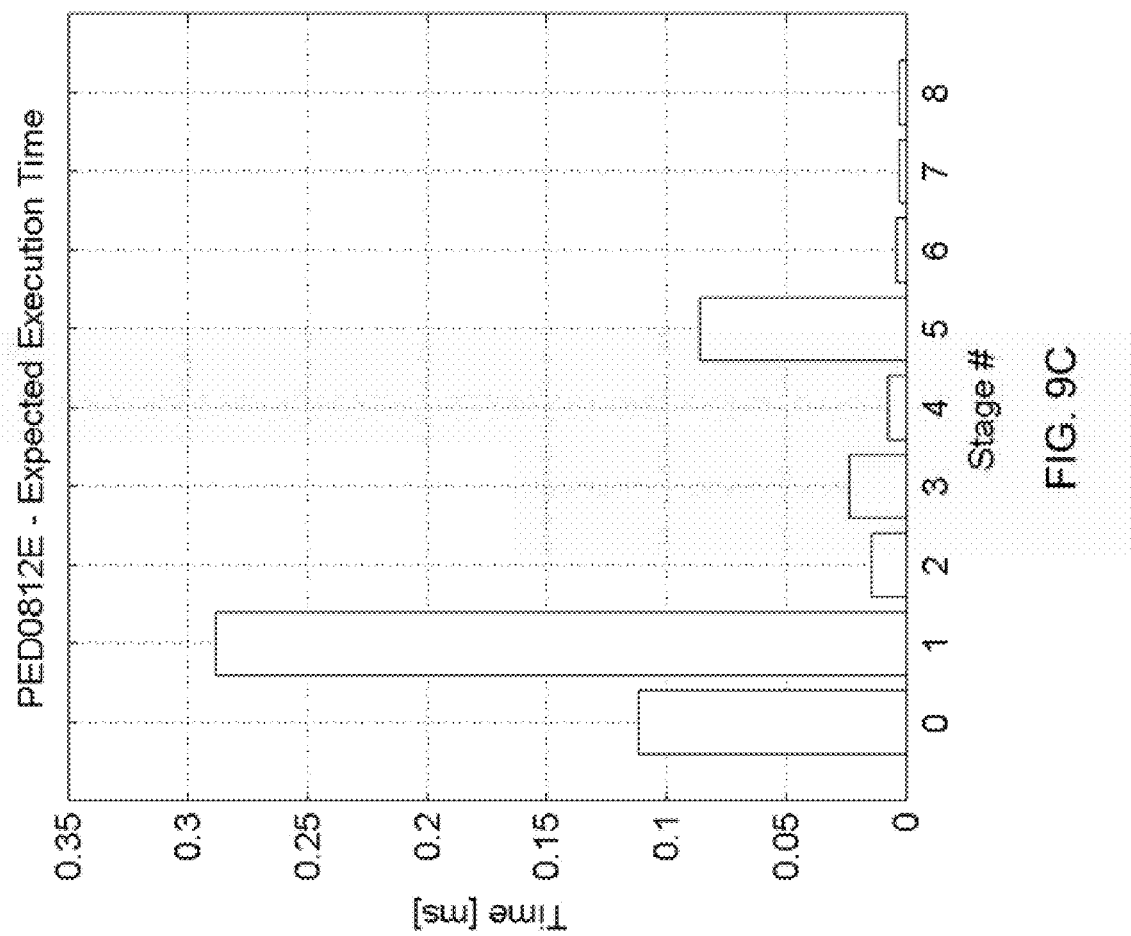
FIG. 9C is a bar graph depicting the expected amount of time required to execute a stage and that the time-consuming Stage 5 is reduced to even below that of the Stage 1.

In FIG. 9A, the proportion of calls that execute Stages 0-8 are shown to decay with each stage in the cascade, as designed. As a result, the amount of time required to compute a particular stage, as shown in FIG. 9B, is reduced when the percentage of time a particular stage is executed is taken into account. In FIG. 9C, the expected amount of time required to execute a stage is shown, and the time-consuming Stage 5 is reduced to even below that of the Stage 1.

What is claimed is:

1. A classifier cascade object detection system, comprising a non transitory memory and one or more processors, the non transitory memory having executable instructions encoded thereon, such that upon execution of the instructions by the one or more processors, the one or more processors perform operations of:

inputting an image patch into parallel feature generation modules, each of the feature generation modules operable for extracting different features from the image patch;

providing the different features to a classifier cascade, the classifier cascade having a series of different classifiers; and executing the classifier cascade by progressively evaluating, in each classifier in the classifier cascade, one or more of the different features to produce a response, if each classifier produces a response that exceeds a predefined threshold then the image patch is classified as a target object, and if the response from any of the classifiers in the classifier cascade does not exceed the predefined threshold, then the image patch is classified as a non-target object;

wherein the classifier cascade is trained by performing operations of:

loading parameters of the image patch, including window position (x,y) with respect to a larger image and window height (h);

loading a cascade template file, the cascade template file defining a number of classifier stages in the classifier cascade, one or more feature types, a classifier type to use in each classifier stage, an aspect ratio of the image patch, and a height of an image storage container which all image patches are re-sampled to;

computing features based on features specified in the cascade template file;

compiling the features for a classifier trainer, the classifier trainer generating a trained classifier;

generating a Receiver-Operating-Characteristics (ROC) curve, which includes false-alarm rate and true-detection rate pairs (FAR,TDR) for a given stage threshold; and tuning the stage threshold.

2. The classifier cascade object detection system as set forth in claim 1, wherein the classifier is an opportunistic classifier cascade, such that the opportunistic classifier cascade has a series of classifier stages; and wherein executing the classifier cascade is further performed by executing the opportunistic classifier cascade by progressively evaluating, in each classifier in the classifier cascade, the features to produce a response, with each response progressively utilized by a decision function to generate a stage response for each classifier stage, such that if each stage response exceeds a stage threshold then the image patch is classified as a target object, and if the stage response from any of the decision functions does not exceed the stage threshold, then the image patch is classified as a non-target object.

3. The classifier cascade object detection system as set forth in claim 2, wherein the decision function utilizes a weight sum of the classifier responses of a current classifier stage and previous classifier stages, as follows:

$$f_n(h_0, h_1, \ldots) = \sum_{i=0}^{n} \alpha_{n,i} \cdot h_i,$$

where $f_n$ is the stage response for stage n, $\alpha_n$ is a weight, and $h_i$ is a classifier response.

4. The classifier cascade object detection system as set forth in claim 3, wherein if $f_n > \tau_n$, where $\tau_n$ is a stage threshold for stage n, the image patch is analyzed by a next stage or classified as a target object; otherwise, the image patch is classified as a non-target object.

5. The classifier cascade object detection system as set forth in claim 4, wherein weights an are set to all ones.

6. The classifier cascade object detection system as set forth in claim 5, wherein the stage threshold is tuned by finding the threshold $\tau^*$ required to achieve the specified target stage true-detection rate (Target TDR), using the ROC curve.

7. The classifier cascade object detection system as set forth in claim 6, wherein the stage threshold is tuned by performing operations of:
setting a stage threshold is set such that:

$$\tau^* = \{\tau: \text{TDR}=\text{Target TDR}\}$$

where TDR is the True Detection Rate curve function for a current classifier stage, such that the target TDR is a parameter used to tune a number of examples to be further analyzed by subsequent classifier stages.

8. The classifier cascade object detection system as set forth in claim 1, further comprising a feature vector recall mechanism, such that features that have been computed in earlier stages in the classifier cascade are made available to other succeeding stages in the classifier cascade that use the same feature.

9. The classifier cascade object detection system as set forth in claim 1, wherein each classifier in the classifier cascade receives an input that is distinct from inputs received by other classifiers in the classifier cascade.

10. A computer implemented method for object detection using a classifier cascade, comprising an act of causing a processor to execute instructions encoded upon a non transitory memory, such that upon execution, the processor performs operations of:

inputting an image patch into parallel feature generation modules, each of the feature generation modules operable for extracting different features from the image patch;
providing the different features to a classifier cascade, the classifier cascade having a series of different classifiers; and
executing the classifier cascade by progressively evaluating, in each classifier in the classifier cascade, one or more of the different features to produce a response, if each classifier produces a response that exceeds a predefined threshold then the image patch is classified as a target object, and if the response from any of the classifiers in the classifier cascade does not exceed the predefined threshold, then the image patch is classified as a non-target object;
wherein the classifier cascade is trained by performing operations of:
loading parameters of the image patch, including window position (x,y) with respect to a larger image and window height (h);
loading a cascade template file, the cascade template file defining a number of classifier stages in the classifier cascade, one or more feature types, a classifier type to use in each classifier stage, an aspect ratio of the image patch, and a height of an image storage container which all image patches are re-sampled to;
computing features based on features specified in the cascade template file;
compiling the features for a classifier trainer, the classifier trainer generating a trained classifier;
generating a Receiver-Operating-Characteristics (ROC) curve, which includes false-alarm rate and true-detection rate pairs (FAR,TDR) for a given stage threshold; and
tuning the stage threshold.

11. The computer implemented method as set forth in claim 10, wherein the decision function utilizes a weight sum of the classifier responses of a current classifier stage and previous classifier stages, as follows:

$$f_n(h_0, h_1, \ldots) = \sum_{i=0}^{n} \alpha_{n,i} \cdot h_i,$$

where $f_n$ is the stage response for stage n, $\alpha_n$ is a weight, and $h_i$ is a classifier response.

12. The computer implemented method as set forth in claim 11, wherein if $f_n > \tau_n$, where $\tau_n$ is a stage threshold for stage n, the image patch is analyzed by a next stage or classified as a target object; otherwise, the image patch is classified as a non-target object.

13. The computer implemented method as set forth in claim 12, wherein weights $\alpha_n$ are set to all ones.

14. The computer implemented method as set forth in claim 13, wherein the stage threshold is tuned by finding the threshold $\tau^*$ required to achieve the specified target stage true-detection rate (Target TDR), using the ROC curve.

15. The computer implemented method as set forth in claim 14, wherein the stage threshold is tuned by performing operations of:
setting a stage threshold is set such that:

$$\tau^* = \{\tau: \text{TDR}=\text{Target TDR}\}$$

where TDR is the True Detection Rate curve function for a current classifier stage, such that the Target TDR is a parameter used to tune a number of examples to be further analyzed by subsequent classifier stages.

16. A computer program product for object detection using a classifier cascade, comprising computer-readable instruction means stored on a non-transitory computer-readable medium that are executable by a computer having a processor for causing the processor to perform operations of:

inputting an image patch into parallel feature generation modules, each of the feature generation modules operable for extracting different features from the image patch;

providing the different features to a classifier cascade, the classifier cascade having a series of different classifiers; and executing the classifier cascade by progressively evaluating, in each classifier in the classifier cascade, one or more of the different features to produce a response, if each classifier produces a response that exceeds a predefined threshold then the image patch is classified as a target object, and if the response from any of the classifiers in the classifier cascade does not exceed the predefined threshold, then the image patch is classified as a non-target object;

wherein the classifier cascade is trained by performing operations of:

loading parameters of the image patch, including window position (x,y) with respect to a larger image and window height (h);

loading a cascade template file, the cascade template file defining a number of classifier stages in the classifier cascade, one or more feature types, a classifier type to use in each classifier stage, an aspect ratio of the image patch, and a height of an image storage container which all image patches are re-sampled to;

computing features based on features specified in the cascade template file;

compiling the features for a classifier trainer, the classifier trainer generating a trained classifier;

generating a Receiver-Operating-Characteristics (ROC) curve, which includes false-alarm rate and true-detection rate pairs (FAR,TDR) for a given stage threshold; and tuning the stage threshold.

17. The computer program product as set forth in claim 16, wherein the decision function utilizes a weight sum of the classifier responses of a current classifier stage and previous classifier stages, as follows:

$$f_n(h_0, h_1, \ldots) = \sum_{i=0}^{n} \alpha_{n,i} \cdot h_i,$$

where $f_n$ is the stage response for stage n, $\alpha_n$ is a weight, and $h_i$ is a classifier response.

18. The computer program product as set forth in claim 17, wherein if $f_n > \tau_n$, where $\tau_n$ is a stage threshold for stage n, the image patch is analyzed by a next stage or classified as a target object; otherwise, the image patch is classified as a non-target object.

19. The computer program product as set forth in claim 18, wherein weights an are set to all ones.

20. The computer program product as set forth in claim 19, wherein the stage threshold is tuned by finding the threshold $\tau^*$ required to achieve the specified target stage true-detection rate (Target TDR), using the ROC curve.

21. The computer program product as set forth in claim 20, wherein the stage threshold is tuned by performing operations of:

setting a stage threshold is set such that:

$$\tau^* = \{\tau: \text{TDR=Target TDR}\}$$

where TDR is the True Detection Rate curve function for a current classifier stage, such that the target TDR is a parameter used to tune a number of examples to be further analyzed by subsequent classifier stages.

* * * * *